March 29, 1927.
S. W. NICHOLSON
1,622,603
MOUNTING FOR WINDOW CONTROL MECHANISM
Filed Aug. 27, 1923
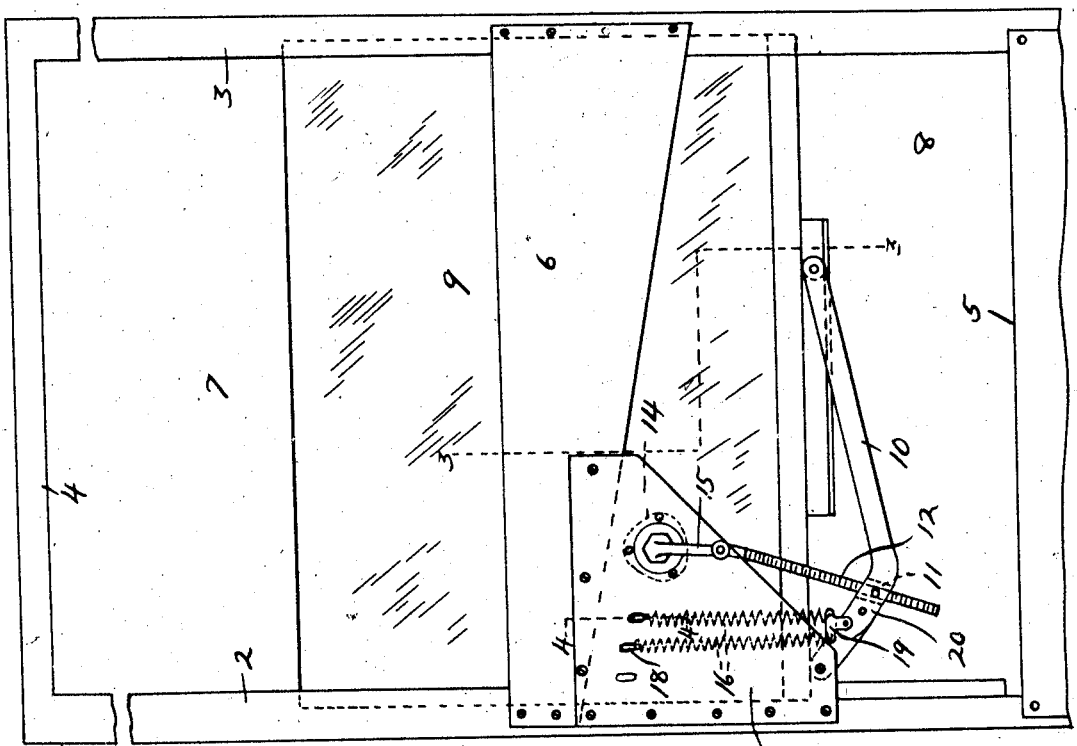
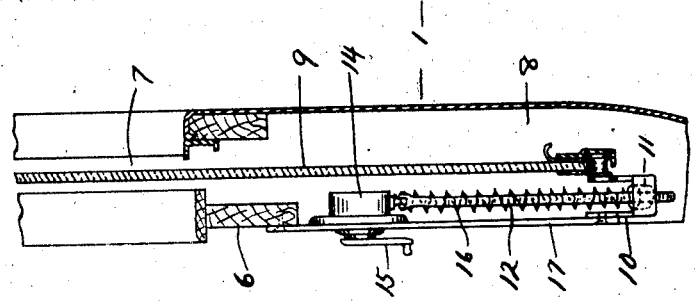
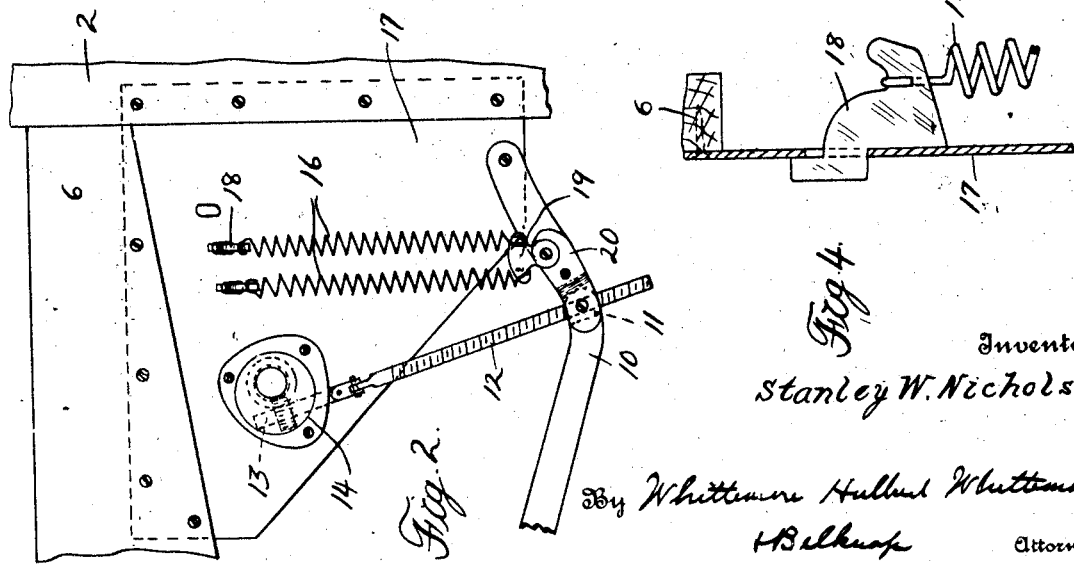
Inventor
Stanley W. Nicholson
By Whittemore Hulbert Whittemore
  Belknap           Attorneys Patented Mar. 29, 1927.

1,622,603

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

MOUNTING FOR WINDOW-CONTROL MECHANISM.

Application filed August 27, 1923. Serial No. 659,666.

The invention relates to mountings for window control mechanisms and refers particularly to mountings for window control mechanisms in motor vehicle doors. One of the objects of the invention is to provide a unitary mounting for the window control mechanism which may be readily applied to a door and which, furthermore, forms a reinforcement for the door. Another object is the provision of a thin plate which carries the window control mechanism and permits the arrangement of the window control arm, the window counterbalancing means, and the control arm actuating means between the plate and the window. Further objects of the invention reside in the provision of an evener for equalizing the tensions of a plurality of springs, the number of which may be varied dependent upon the weight of the window, and in the novel features of construction and combinations and arrangements of parts as more fully hereinafter set forth.

In the drawings:

Figure 1 is an inside elevation partly broken away of a motor vehicle door with the construction embodying my invention applied;

Figure 2 is an outside elevation of a portion thereof;

Figure 3 is a cross section on the line 3—3 of Figure 1;

Figure 4 is a cross section on the line 4—4 of Figure 1.

1 is the door of a motor vehicle, the frame of which comprises the hinge and lock upright members or pillars 2 and 3 respectively, the top and bottom rails 4 and 5 respectively and the intermediate lock board 6. The door has in its upper portion the opening 7 and in its lower portion the chamber 8 adapted to receive the window 9 in the nature of a glass plate which is slidably engageable in guideways in the upright members 2 and 3.

10 is a pivotal control arm of the window control mechanism having its outer or free end operatively connected to the lower edge of the window 9. 11 is a nut pivotally mounted upon the control arm and threadedly engaged by the screw 12, the upper end of which is operatively connected to gearing 13 in the gear case 14, this gearing being driven by means of the handle 15. 16 are window counterbalancing coil springs connected to the control arm 10.

For the purpose of providing a unitary mounting for the window control mechanism and at the same time for reinforcing the door frame, I have provided the gusset plate 17 formed of thin metal and extending across the lower corner between the hinge upright member 2 and the lock board 6. The upper edge and the outer side edge of the gusset plate are preferably set in rabbeted portions of the lock board and hinge upright member respectively and secured thereto by means of screws, the arrangement being such that the gusset plate reinforces the door frame. The control arm 10 of the window control mechanism is pivotally mounted upon the lower portion of the gusset plate and the gear case 14 is secured to the upper inner portion of the gusset plate. Also the upper ends of the counterbalancing coil springs 16 are secured to the gusset plate by means of the hooks 18 detachably engaging in apertures in the gusset plate. To equalize the tensions of the springs, I have provided an evener 19 between the lower ends of the coil springs and the clip 20 for the nut 11, this clip being rigidly secured to the control arm. The window control mechanism is entirely upon the inner side of the window. The gusset plate is made thin to provide sufficient space between the gusset plate and the window for the pivotal end of the control arm 10, the screw 12, the gear case 14, and the window counterbalancing coil springs 16, so that the window control mechanism and the gusset plate may be assembled to form a unit which is attachable to the door frame.

From the above description it will be readily seen that I have provided a unitary mounting for a window control mechanism which additionally reinforces the frame in which the window slidably engages. It will also be seen that this mounting being formed of a thin metallic gusset plate provides sufficient space between the gusset plate and the window for receiving the different parts of the window control mechanism so that all may be mounted at one side of the window.

Furthermore, it will be seen that by means of my evener a plurality of counterbalancing coil springs may be used and the tensions exerted by the same may be equalized.

What I claim as my invention is:

1. The combination with a frame including an upright member and a lateral member and a window slidably engaging said frame, of a gusset plate extending across a corner between and connected to said upright and lateral members and secured to said members to reinforce said frame, a control arm pivotally mounted upon said gusset plate and operatively connected to said window, the pivotal end of said control arm being located between said gusset plate and the path of travel of said window, counterbalancing means for said window connected to said gusset plate and control arm and located between said gusset plate and path of travel of said window and means for actuating said control arm located between said gusset plate and the path of travel of said window, said control arm, counterbalancing means and actuating means being mounted in connection with said gusset plate to form a unitary structure.

2. The combination with a frame including an upright member and a lateral member and a window slidably engaging said frame, of a gusset plate extending across a corner between said upright and lateral members and secured thereto for reinforcing said frame, a control arm pivotally mounted upon said gusset plate, the pivotal end of said control arm being located between said gusset plate and the path of travel of said window, gearing upon said gusset plate, a threaded member pivotally connected to said gearing and control arm for actuating the latter from the former, said threaded member being located between said gusset plate and the path of travel of said window, and means mounted upon said gusset plate and connected to said control arm for counterbalancing the window, said counterbalancing means being located between said gusset plate and the path of travel of said window, said control arm, gearing, threaded member and counterbalancing means being mounted in connection with said gusset plate to form a unitary structure.

In testimony whereof I affix my signature.

STANLEY W. NICHOLSON.